(12) United States Patent
Bishop et al.

(10) Patent No.: US 10,193,948 B2
(45) Date of Patent: Jan. 29, 2019

(54) SYSTEM AND PROTOCOL FOR REMOTE SUPERVISORY PARENTAL OBSERVATION, INTERACTION, AND MANAGEMENT OF MEDIA CONTENT ON DIGITAL CONTENT-DELIVERY DEVICES

(71) Applicant: Public Broadcasting Service, Arlington, VA (US)

(72) Inventors: Chris Bishop, Alexandria, VA (US); Sam Deng, Washington, DC (US); Sara DeWitt, San Antonio, TX (US); Karin Jue, Arlington, VA (US); Miguel Montanez, Crofton, MD (US); Jeremy Roberts, Alexandria, VA (US)

(73) Assignee: PUBLIC BROADCASTING SERVICES, Arlington, VA (US)

( * ) Notice: Subject to any disclaimer, the term of this patent is extended or adjusted under 35 U.S.C. 154(b) by 294 days.

(21) Appl. No.: 14/706,379

(22) Filed: May 7, 2015

(65) Prior Publication Data
US 2015/0326453 A1  Nov. 12, 2015

Related U.S. Application Data

(60) Provisional application No. 61/990,100, filed on May 7, 2014.

(51) Int. Cl.
*G06F 15/16* (2006.01)
*H04L 29/08* (2006.01)
(Continued)

(52) U.S. Cl.
CPC .............. *H04L 67/02* (2013.01); *H04L 43/04* (2013.01); *H04L 65/60* (2013.01); *H04L 67/22* (2013.01)

(58) Field of Classification Search
CPC ......... H04L 12/26; H04L 43/04; H04L 65/60; H04L 67/02; H04L 67/22
See application file for complete search history.

(56) References Cited

U.S. PATENT DOCUMENTS

8,825,612 B1 * 9/2014 Ruzon ............... G06F 17/30247
707/694
9,721,082 B2 * 8/2017 Fujioka ................... G06F 21/34
(Continued)

*Primary Examiner* — Viet D Vu
(74) *Attorney, Agent, or Firm* — Brundidge & Stanger, P.C.

(57) ABSTRACT

Embodiments of the present invention relate to systems and protocols for a media management application to be used by a supervisor to monitor, manage, and control what a subject is watching, listening to, or interacting with on a media delivery device. A media interaction application executes on a media delivery device and is configured to collect media interaction data based on tracked user interactions with media content on the media delivery device. A remote media management application executes on a portable electronic device and is configured to monitor the media interaction data and further configured to issue media management instructions to the media interaction application. A communications broker executes on a first network server and is configured to provide secure communications between the media interaction application and the remote media management application. A media interaction analysis application executes on a second network server and is configured to receive the media interaction data from the media interaction application, to transform the media interaction data into summary media interaction data, and to provide the summary media interaction data to the remote media management application. The media interaction application is further configured to transmit the media interaction data to the remote media management application via the communications broker. The remote media management application is further configured to issue the media management instruc- (Continued)

tions to the media interaction application via the communications broker. And the media interaction analysis application is further configured to receive the media interaction data via the communications broker.

1 Claim, 9 Drawing Sheets

(51) Int. Cl.
*H04L 12/26* (2006.01)
*H04L 29/06* (2006.01)

(56) References Cited

U.S. PATENT DOCUMENTS

| | | | |
|---|---|---|---|
| 2001/0042045 A1* | 11/2001 | Howard | G06F 21/10 |
| | | | 705/51 |
| 2005/0240959 A1* | 10/2005 | Kuhn | H04N 7/163 |
| | | | 725/25 |
| 2006/0085844 A1* | 4/2006 | Buer | H04L 63/068 |
| | | | 726/4 |
| 2009/0089380 A1* | 4/2009 | Wang | G06F 17/30864 |
| | | | 709/206 |
| 2015/0281250 A1* | 10/2015 | Miller | G06F 17/30056 |
| | | | 726/1 |
| 2017/0171617 A1* | 6/2017 | Gonzalez | H04N 21/4542 |

* cited by examiner

SYSTEM AND PROTOCOL FOR REMOTE SUPERVISORY PARENTAL OBSERVATION, INTERACTION, AND MANAGEMENT OF MEDIA CONTENT ON DIGITAL CONTENT-DELIVERY DEVICES

CROSS-REFERENCE TO RELATED APPLICATIONS

This application claims priority under 35 U.S.C. § 119(e) to U.S. Provisional Patent Application No. 61/990,100, entitled "System and Protocol for Remote Device Monitoring and Control," filed May 7, 2014.

FIELD OF THE INVENTION

Embodiments of the invention relate generally to the management of media content consumption. More specifically, embodiments of the invention relate to a system and protocol for remotely managing the consumption of media content, especially in the context of parental management of the delivery of media content to children.

BACKGROUND

Digital content is consumed across a highly diverse range of platforms and devices. This poses a challenge for persons in a supervisory role aiming to discover and monitor specific content being delivered to such devices, as well as to gain insight into the nature and quality of a given subject's interactions with that content. It can be difficult, for example, for a parent to discover the extent to which a child may be using digital content delivery devices and especially to monitor which content a child may be viewing. Additionally, because some content maybe interactive and/or educational, a parent, instructor, or supervisor may wish to receive reports (both summary reports and real-time reports) about how well a child, student, or employee is performing or has performed while interacting with delivered content. There is therefore a need for a system and protocol to provide remote supervisory observation, interaction, and management of the delivery of media content on digital content-delivery devices.

SUMMARY OF THE INVENTION

This summary should not be considered limiting of the scope of the present invention, but rather is set forth to provide an overview of the features and benefits of the present invention.

The present invention relates to systems and protocols to enable a media interaction application, as downloaded by a user to a media delivery device, to communicate with and be controlled over a network by a media management application executing on a remote media management device. More specifically, embodiments of the present invention relate to systems and protocols for a media management application to be used by a supervisor to monitor, manage, and control what a subject is watching, listening to, or interacting with on a media delivery device. The media delivery device can comprise, for example, any suitable media delivery or content delivery device, including a mobile device such as a smartphone, a desktop computer, a laptop computer, a television, a game device, or any similar media delivery device. The media management device can comprise, for example, a mobile device such as a smartphone, a desktop computer, a laptop computer, or any similar computing device.

In the context of embodiments of the invention, a supervisor user or "supervisor" is a person capable of using a media management application to observe, manage, and control a subject's interaction with digital content delivered from a content provider via a media interaction application executing on a media delivery device. As a non-limiting example, a supervisor may be a parent, a guardian, a teacher, a manager, or any individual who is senior to a subject, described below.

Also in the context of embodiments, a subject user or "subject" is a person capable of using one or more media interaction applications executing on a media delivery device. As a non-limiting example, a subject may be a child, a student, an employee, or any individual who is junior to a supervisor.

The systems and protocols provided by embodiments of the invention offer a connected experience that enables supervisors to control and manage remotely what their subjects are learning in television programs, games and videos. The systems and protocols help supervisors to manage a subject's content interaction time and also to build upon a subject's learning away from the digital content delivery screen through real-time updates, educational tips, and activity ideas related to the subject's interests.

For example, in one embodiment, using the systems and protocols described herein, supervisors can enter a code on their media management device: (a) to start receiving real-time information regarding what a subject is playing, watching, and learning on the media delivery device; (b) to remotely set a timer from their media management device that will put a program or television station that a subject has open on their media delivery device to sleep on the subject's screen, thereby easing the transition from playing online to another activity; (c) to access related activities that supervisors and subjects can do to extend the fun and learning goals of the games or videos a subject plays or watches on the media delivery device; and/or (d) to receive an activity summary permitting a supervisor to view top educational skills, shows, videos and games their subject used on a media delivery device.

The systems and protocols of the embodiments are built on a platform that allows for the seamless, real-time pairing of multi-platform experiences and content on any device with an Internet connection. The connection does not require physical proximity, making it easy for supervisors to see and connect to a subject's screen-time experience anywhere.

The systems and protocols described herein can be used by embodiments to support persistent real-time supervisory sessions that survive network connectivity disruption, application restart, and device reboot. The systems and protocols enable supervision of any number of subjects in a technology-agnostic manner. The systems and protocols enable full-duplex communication to allow simultaneous observation of subject activity and dispatch of interactive commands. The systems and protocols described herein are distance agnostic such that the supervisor and subject can be separated by any physical or logical distance.

BRIEF DESCRIPTION OF THE DRAWINGS

So that the manner in which the above recited summary features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

Embodiments of the present invention will be described with reference to the accompanying drawings, wherein like parts are designated by like reference numerals throughout, and wherein the leftmost digit of each reference number refers to the drawing number of the figure in which the referenced part first appears.

Figure 1:
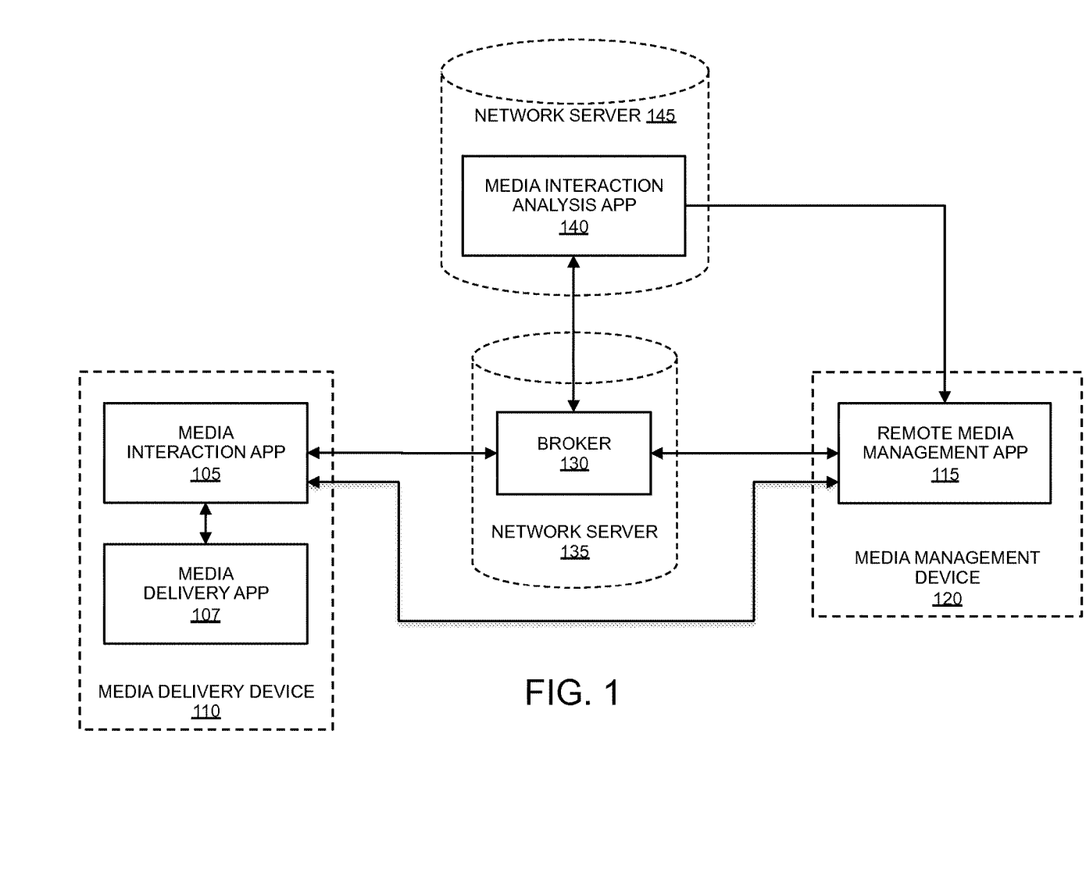
FIG. 1 illustrates a block diagram of an exemplary embodiment of the invention, in accordance with the present disclosure.

FIG. 1 illustrates a block diagram of an exemplary embodiment of the invention, in accordance with the present disclosure.

Media Interaction Application

In FIG. 1, media interaction application 105 is a software application executing on media delivery device 110 to monitor and control the delivery of media content. As the media content is delivered to a subject by a media delivery application 107 such as a game, lesson or training application, media interaction application 105 can monitor and track the delivery of media content, and can also monitor and track the subject's interactions with the media content, to create media interaction data describing the subject matter of media content delivered to the subject, as well as describing the subject's interactions with the media content during its delivery.

Media interaction application 105 monitors and tracks delivery of media and content, as well as user interactions with the media content and content delivered to a subject by media delivery application 107, by using various protocols described below.

With reference to the embodiment in FIG. 1, media interaction data are collected and can be transmitted by the media interaction application 105 to a remote media management application 115 executing on a remote media management device 120. Media interaction data can comprise data transmitted or otherwise made available to the media interaction application 105 by a media delivery application 107.

The media interaction data can be transmitted securely to the remote media management application 115 via a communications broker 130, which ensures the security of the transmission. Alternatively, media interaction data can be transmitted directly to the remote media management application 115, without any intermediate involvement by communications broker 130. Media interaction data can be transmitted as it is collected or it can be saved and cached for later delivery according to methods known by those skilled in the art.

With reference to the embodiment in FIG. 1, media interaction data can also be transmitted by the media interaction application 105 to a media interaction analysis application 140 executing on a network server 145. The media interaction data can be transmitted securely to the media interaction analysis application 140 via a communications broker 130, which ensures the security of the transmission. The media interaction data can be processed by the media interaction analysis application 140 according to methods described below, and then sent to the remote media management application 115, either directly or via communications broker 130.

Media interaction application 105 is also configured to receive media management instructions from the remote media management application 115 via communications broker 130. By way of non-limiting examples, the media management instructions can include instructions: (a) to permit the remote media management application 115 to receive real-time information regarding what a subject is playing, watching, and learning on the media delivery device 110; (b) to remotely set a timer from the media management device 120 that will put the program or television station that a subject has open on their media delivery device 110 to sleep on the subject's screen; (c) to access related activities that supervisors and subjects can do to extend the games or goals of media a subject plays or watches on the media delivery device 110; and/or (d) to receive information or summaries of activity from the media interaction analysis application 140 regarding what the subject used on a media delivery device 110. Media interaction application 105 can execute these received media management instructions by using the protocols described below.

Media interaction application 105 may communicate with remote media management application 115 via communications broker 130 by using communications protocols such as HTML5 WebSockets with JS Long Polling fallback or any other suitable communications protocols known in the art.

Media Delivery Application

Still referring to FIG. 1, media delivery application 107 is an application configured to deliver media and/or content to a subject user. The terms "media," "content," and "media content" are interchangeable and can each include any form of digital media and/or content delivered by computing software to a user using devices such as game consoles, laptop computers, desktop computers, hand-held computers, and all forms of smartphones and equivalent devices. For example, media and content can refer to games, images, videos, educational or instructional information, portions of Internet web pages or web sites, messages, video calls, and phone calls.

Media interaction application 105 may communicate with media delivery application 107 by any of several mechanisms known in the art, including inter-process connections, network connections (e.g., TCP/IP), wireless connections (e.g., Bluetooth, WiFi, AirDrop, etc.), messages, signals, files, and shared memory conventions.

Communications between media interaction application 105 and media delivery application 107 may use protocols and messages common to both applications. For example, media delivery application 107 can be a children's media application specially created for use by embodiments of the claimed invention. In this kind of configuration, media interaction application 105 can receive media interaction data directly from media delivery application 107 and forward that data to the remote media management application 115 (described in greater detail below). In this way, a supervisor interacting with the remote media management application 115 can view, in real-time, a subject's interaction with content being delivered to the subject by the media delivery application 107. The same media interaction data can also be transmitted to the media interaction analysis application 140, where the data can be analyzed and a supervisor can be supplied with information such as recommendations about other skills a subject may need to work on, in order to better understand or perform certain aspects of delivered media content.

It is also possible for media interaction application 105 to monitor the actions of a subject that is using a foreign or unknown media delivery application 107. In this circumstance, media interaction application 105 may be able to create media interaction data describing which media delivery application 107 was invoked by the subject, how long the subject used that media delivery application 107, and the extent to which the subject may have been interacting with the media delivery application 107, by for example, monitoring button or keyboard activity, as well as other devices used provide input to media delivery application 107. Such media interaction data may be supplied by media interaction application 105 to both the remote media management application 115 as well as the media interaction analysis application 140.

Remote Media Management Application

Again with reference to FIG. 1, remote media management application 115 is another software component of an exemplary embodiment of the invention. Remote media management application 115 executes on remote media management device 120 and can be configured to receive certain media interaction data produced by media interaction application 105. Remote media management application 115 can be further configured: (a) to issue media management instructions to media interaction application 105; and (b) to receive media interaction analysis data generated by the media interaction analysis application 140 executing on network server 145.

According to embodiments, the remote media management application 115 communicates with the media interaction application 105 via the communications broker 130. To initiate a connection, a user of the remote media management application 115 (e.g., a supervisor) may retrieve a connect code from the communications broker 130 and then enter the connect code on the remote media management device 120. Once a connection is established between the remote media management application 115 and the communications broker 130, the remote media management application 115 can interact with one or more media interaction applications 105. Moreover, once connected, the remote media management application 115 can control and receive data from the one or more media interaction applications 105. The user of the remote media management application 115 (i.e., the supervisor) can also retrieve multiple connect codes from the broker 130 and can enter the appropriate connect codes on one or more remote media management devices 120 in order to interact with multiple subject users of one media delivery device 110.

According to embodiments, the remote media management application 115 may be configured to track the video, audio, and other aspects of media or content that one or more media delivery devices 110 are running, and may inform users of the media delivery devices 110 about that content and suggest additional content or activities.

In one embodiment, the remote media management application 115 includes a timing device, whereby the user of the remote media management application 115 (i.e., the supervisor) can remotely shut down or disable the media delivery device 110. In an alternate embodiment, the timing device can be located on media interaction application 105 and remotely triggered or set by an appropriate command or instruction from media management application 115.

The remote media management device 120 can be a mobile phone or similar device capable of executing applications that communicate over the Internet, including any form of Smartphone. The remote media management device 120 can also be a general purpose computing device capable of executing applications that communicate over the Internet, including a laptop computer, a desktop computer, or similar device known to those skilled in the art.

Remote media management application 115 can communicate with remote media interaction application 105 via communications broker 130 by using communications protocols such as HTML5 WebSockets with JS Long Polling fallback or any other suitable communications protocols known in the art. Similarly, remote media management application 115 can communicate with media interaction analysis application 140 by using communications protocols such as HTML5 WebSockets with JS Long Polling fallback or any other suitable communications protocols known in the art.

Communications Broker

Still with reference to FIG. 1, all communications between media interaction application 105 and remote media management application 115 can go through communications broker 130. Broker 130 is an application that executes on a network server 135 apart from both the media delivery device 110 and the media management device 120. Broker 130 provides a secure communications mechanism that ensures all interactions between media interaction application 105 and remote media management application 115 are secure.

Communications broker 130 may also forward certain portions of media interaction data (produced by the media interaction application 105) to a media interaction analysis application 140 executing on network server 145. Network server 135 and network server 140 may optionally be the same server. When network server 135 and network server 140 are the same physical server, communications between them may be implemented by inter-process communication techniques known in the art. Otherwise, all communications between application processes executing on the various devices described in the embodiments are implemented by internetworking protocols known in the art.

Media interaction analysis application 140 may be configured (1) to receive the media interaction data from the media interaction application 105, (2) to transform the media interaction data into summary media interaction data, and (3) to provide the summary media interaction data to the remote media management application 115. The summary media interaction data may be transferred directly from the media interaction analysis application 140 to the remote media management application 115, or the summary media interaction data may be transferred from the media interaction analysis application 140 to the remote media management application 115 through the communications broker 130.

Remote media management application 115 may be further configured to issue media management instructions to the media interaction application 105 via the communications broker 130.

In some embodiments, communication to and from broker 130 can be implemented using WebSockets. The HTML5 WebSockets specification defines an API that enables web pages to use the WebSockets protocol for two-way communication with a remote host. The WebSocket specification defines a full-duplex single socket connection over which messages can be sent between the media interaction application 105 and a server (for example, network server 135 or 145). Other protocols of comparable functionality could be substituted. Embodiments of the invention can also be implemented using, as non-limiting examples, Cordova, and Node.js.

Media Interaction Analysis Application

Still with reference to FIG. 1, media interaction analysis application 140 can execute on a network server 145 (or network server 135) and can process categories of media interaction data that media interaction application 105 creates. Such media interaction data can, for example, describe the subject matter of media content delivered to the subject, as well as describing the subject's interactions with the media content during its delivery. Media interaction analysis application 140 then sends such data to the remote media management application 115, either directly or via communications broker 130.

In embodiments, media interaction analysis application 140 can be capable of synchronizing with a media interaction application 105, via a synchronization token provided by the broker 130. Once synchronized, media interaction analysis application 140 can observe activities from the media interaction application 105, and can interact with it by issuing commands.

Features of the Embodiments

Embodiments of the invention can be used to increase a supervisor's engagement and awareness of media and content viewed on the media delivery device 110. The embodiments can also be used to support the supervisor's ability to improve the subject's learning and education (in some embodiments, through "anytime is learning time" tips and activities).

The systems and protocols described herein can be used to provide, among other features:

A) A real-time connection to the subject's activity on the media interaction application 105.

B) Information about what the subject is playing, watching or learning about on media delivery device 110.

C) A summary of media and content delivered to the subject, for example, games and/or videos played, and skills learned by the subject. The supervisor can be provided with visibility into what the subject is doing.

D) Enforced limits on the use of media or content delivered to the subject on media delivery device 110.

Current Activity Feed Feature

Embodiments of the invention can provide a current activity feed feature to the supervisor via remote media management application 115 that generates a real-time update on what content the subject is consuming, what the subject is playing, studying, or what the subject is currently watching on the media delivery device 110.

History Feature

Embodiments of the invention can provide a list of what the subject has already watched during a media delivery session and a list of the amount of time the subject has spent interacting with media and/or content on media delivery device 110. History data provided can also include statistics relating to the subject's activities. The history data can be used to create a reverse timeline of the subject's viewing activities identifying a media segment and a time, e.g., "playing now," "1 min ago," or "2 min ago."

Remote Control Feature

In embodiments, the remote media management application 115 can provide the supervisor with a control panel to control the subject's experience on the media interaction application 105, including:

A timer to control when the user can use media-delivery applications on the media delivery device 110, including scheduling functionality; and A control panel for any media-delivery applications operating on the media delivery device 110, so that a supervisor can perform arbitrary control operations, such as play/pause, or select what clip the subject can watch. The control panel can be preconfigured with selectable messages that can be displayed at the video player at the time the clip is paused, such as "Time for Dinner," "Bed Time," "Break Time," and so forth.

System Processes

A supervisor session can comprise an association between at least one media management device 120 and one media delivery device 110. Synchronization denotes an associative mechanism by which the media management device 120 and media delivery device 110 discover each other, as mediated by the broker 130.

Information regarding activities performed on the media interaction application 105 can be sent to the remote media management application 115 directly, through a broker 130 or through a media interaction analysis application 140.

A supervisor can have the ability to initiate commands using the remote media management application 115 and can send those commands either directly or through a broker 130 to the media interaction application 105.

Protocol Specification

The protocols described herein can be used in the context of monitoring usage of any arbitrary software as a service ("SAAS") application. Various elements of the protocols are described in more detail below.

Handshake Protocol

Figure 2:
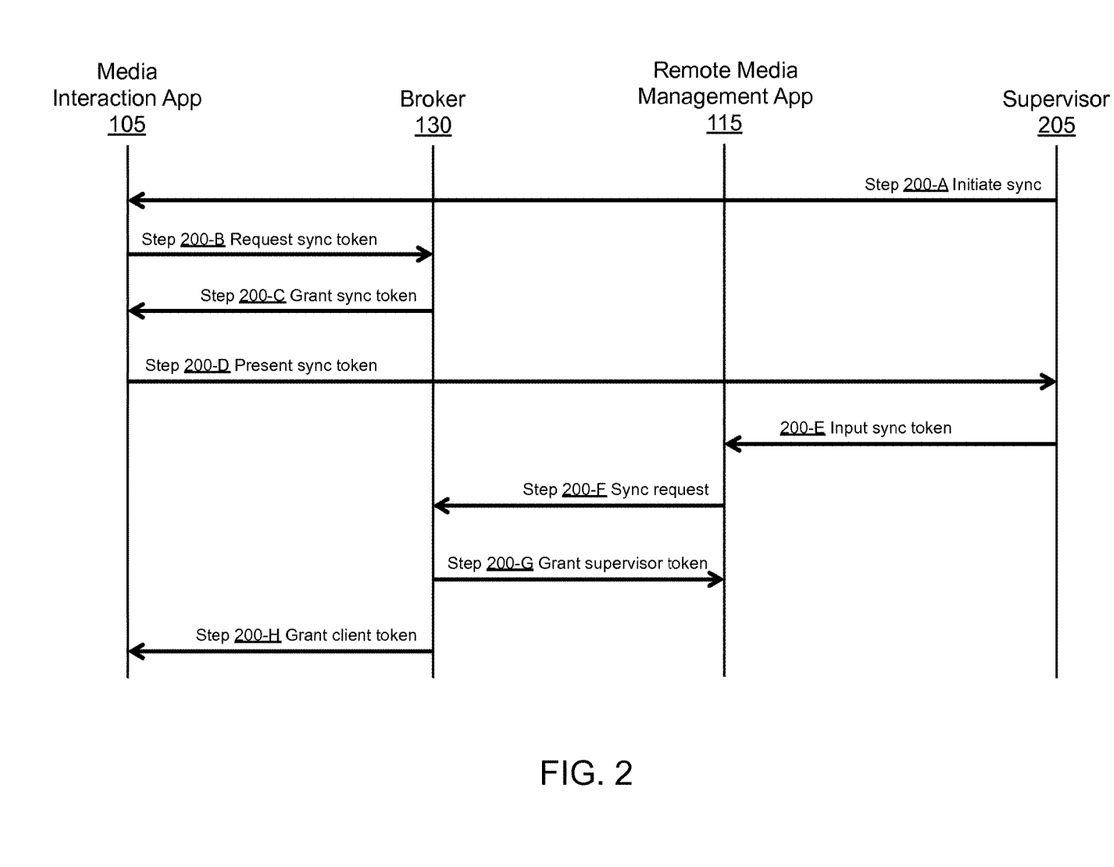
FIG. 2 illustrates an exemplary embodiment of a handshake protocol, in accordance with the present disclosure.

FIG. 2 illustrates an exemplary embodiment of a handshake protocol, in accordance with the present disclosure.

At step 200-A of FIG. 2, a supervisor can initiate a synchronization handshake through the remote media management application 115. For example, clicking on a "Connect Now" button in the remote media management application 115 user-interface ("UI").

At step 200-B, media interaction application 105 can request a synchronization token from the broker 130.

At step 200-C, broker 130 can create a unique synchronization token and a separate unique media interaction application token (e.g., a Universal Unique Identifier or "UUID"). In one embodiment, the UUID is UUID v4. The two tokens are associated with each other and stored at broker 130. A short lifespan for these tokens is recommended. Additionally, it should be convenient for a supervisor to provide the synchronization token to the remote media management application 115 (e.g. a short alphanumeric string).

At step 200-D, media interaction application 105 presents the synchronization token to the supervisor via the remote media management application 115, via the broker 130.

At step 200-E, a supervisor provides the presented synchronization code to the remote media management application 115 (e.g. by typing it in).

At step 200-F, remote media management application 115 sends a synchronization request to the broker 130, with the synchronization token attached.

At step 200-G, broker 130 validates that the synchronization request received in step 200-F is the same synchronization token in its records and has not yet expired. If the validation fails, an error is sent to the remote media management application 115 and the handshake aborts. If validation passes, a unique remote media management application token is generated (UUID v4) and associated with the media interaction application 105. The original synchronization token is disassociated and destroyed. Broker 130 sends the remote media management application token to the remote media management application 115, where it is saved. A message channel is created for the remote media management application 115. The media interaction application 105 is subscribed to the message channel.

At step 200-H, broker 130 sends the media interaction application token to the media interaction application 105, where it is saved. A message channel is created for the media interaction application 105. The remote media management application 115 is then subscribed to the message channel.

Activity Stream Management Protocol

Figure 3:
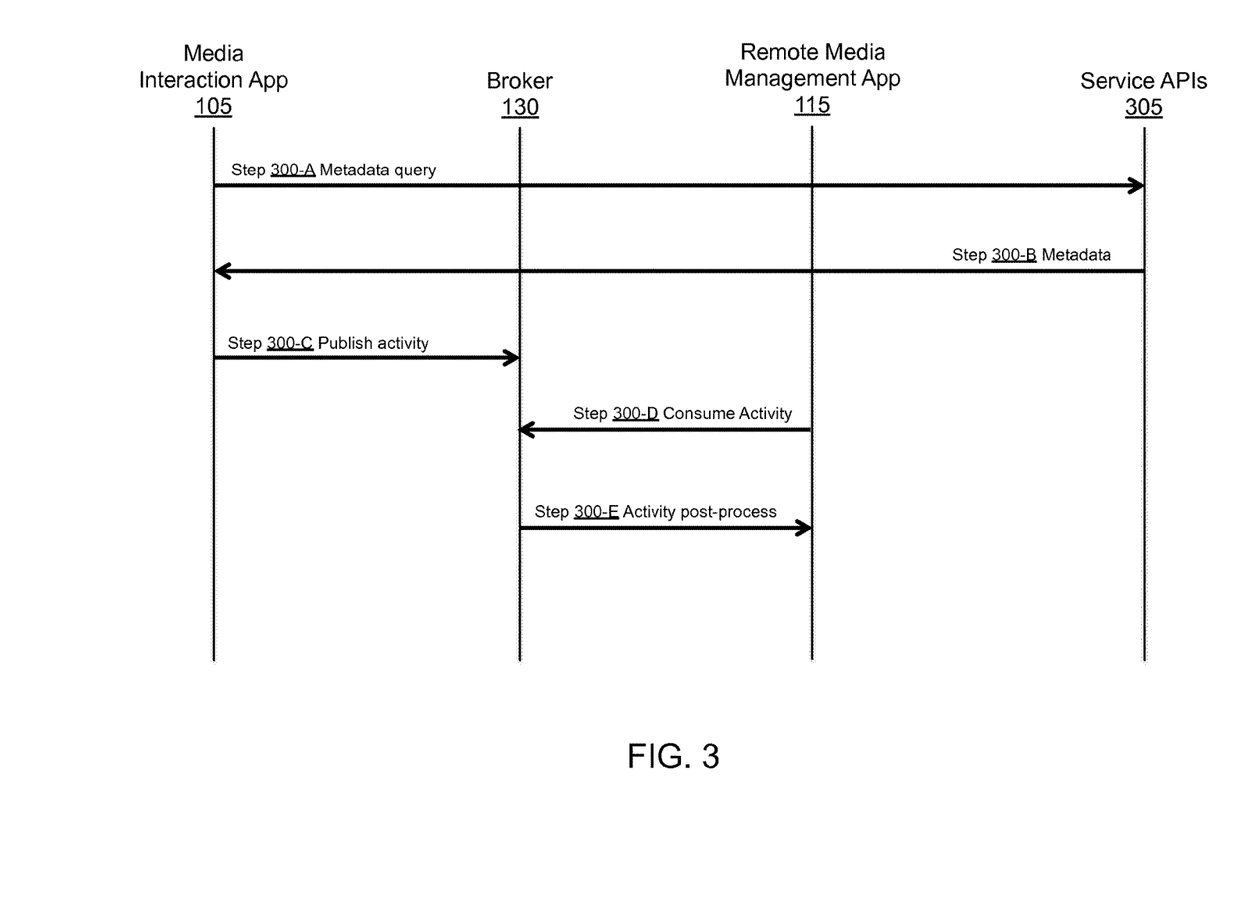
FIG. 3 illustrates an exemplary embodiment of an activity stream protocol, in accordance with the present disclosure.

FIG. 3 illustrates an exemplary embodiment of an activity stream protocol, in accordance with the present disclosure.

At step 300-A of FIG. 3, media interaction application 105 may query for metadata about its own state, as a subject interacts with media delivered by media delivery device 110, or in response to certain events and/or conditions on media delivery device 110. These queries can be introspective or done via external service API endpoints as depicted.

At step 300-B, remote service APIs on remote media management application 115 may respond with metadata requested in step 300-A.

At step 300-C, media interaction application 105 may consume the received metadata, transforming it into activity data payload(s). Media interaction application 105 may then publish its activities to its message channel, identified by its own media interaction application token created during the initial synchronization handshake with the broker 130. Business rules dictate when and how a particular media interaction application 105 should publish activities. Upon receiving activities, the broker 130 buffers them in case the remote media management application 115 is offline at the time the messages were published.

At step 300-D, remote media management application 115 automatically consumes activities that were published by its associated media interaction application 105, as the broker 130 subscribes the remote media management application 115 to its associated media interaction application 105 channel.

At step 300-E, optional post processing of incoming activities can occur. For example, to rollup new activity data as a summary data set of aggregate values. Activity post processing can be configured to occur at the broker 130, remote media management application 115, or elsewhere.

Command and Monitoring Protocol

Figure 4:
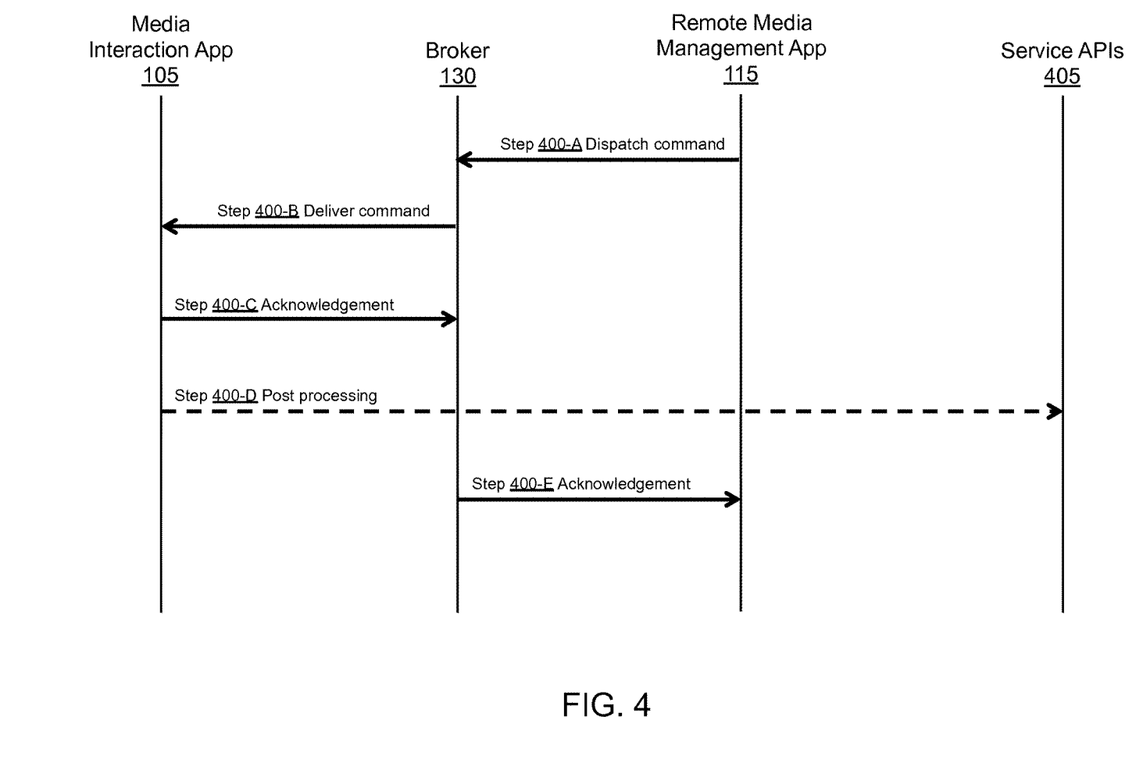
FIG. 4 illustrates an exemplary embodiment of a command and status protocol, in accordance with the present disclosure.

FIG. 4 illustrates an exemplary embodiment of a command and status protocol, in accordance with the present disclosure.

At step 400-A of FIG. 4, a supervisor (via remote media management application 115 interaction) or the remote media management application 115 itself may publish a dispatch command to the broker 130 through its message channel, identified by its own remote media management application 115 token.

At step 400-B, broker 130 may validate that the remote media management application 115 token exists and looks up its associated media interaction application 105 token. Broker 130 may then forward a deliver command to media interaction application 105 channel (identified by media interaction application 105 token).

At step 400-C, media interaction application 105 can automatically receive the deliver command due to its subscription to the channel identified by its own media interaction application 105 token.

The deliver command is fulfilled by the media interaction application 105 and an acknowledgement, with optional attached side-effects, are published to the broker 130 via the media interaction application 105 channel identified by the media interaction application 105 token.

At step 400-D, optional post processing on the deliver command can occur. A dotted line on this step in FIG. 4 depicts an example of a potential action to external API services 405, such as a notification.

At step 400-E, broker 130 validates media interaction application 105 token by making sure it exists and looks up its associated remote media management application 115 token. The message payload, command acknowledgement with status, is delivered to the remote media management application 115 via the remote media management application 115 channel.

Remote Media Management Application Automatic Resynchronization Protocol

Figure 5:
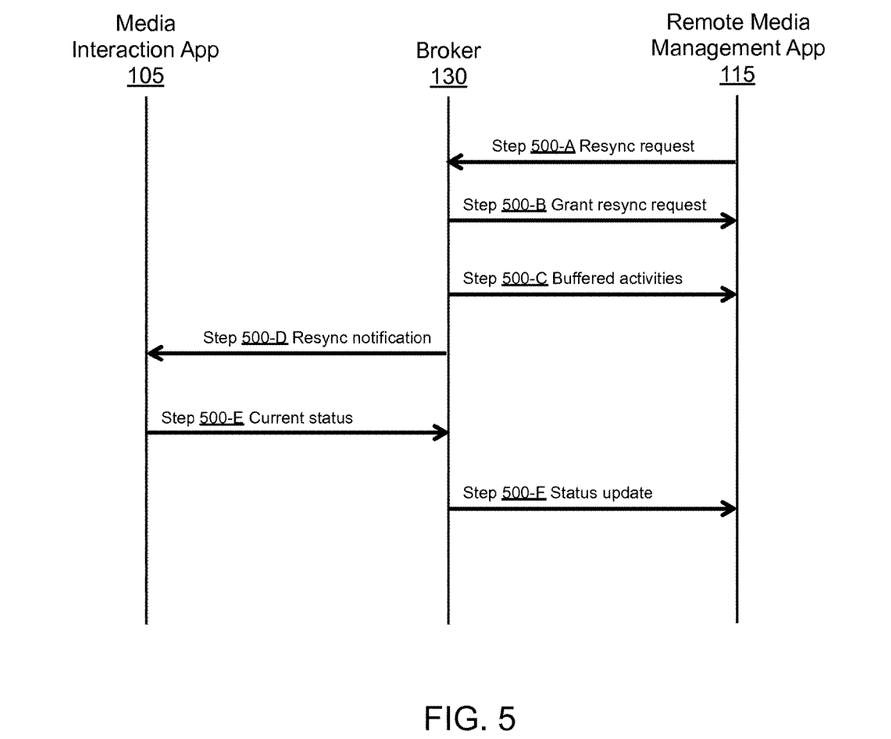
FIG. 5 illustrates an exemplary embodiment of an automatic resynchronization protocol at the remote media management application, in accordance with the present disclosure.

FIG. 5 illustrates an exemplary embodiment of an automatic resynchronization protocol at the remote media management application 115, in accordance with the present disclosure.

At step 500-A, remote media management application 115 may resume operation from inactive state (e.g. sleep, frozen, closed, offline). If a remote media management application 115 token exists (saved from a previous handshake), the remote media management application 115 can issues a remote media management application 115 resynchronization request with its own remote media management application 115 token attached.

At step 500-B, broker 130 can validate the remote media management application 115 token and respond to the remote media management application 115 with an acknowledgement granting the resynchronization request. An associated media interaction application 105 token may then be looked up and the remote media management application 115 can be re-subscribed to the message channel identified by the media interaction application 105 token.

At step 500-C, buffered messages collected during remote media management application 115 inactive periods can be sent to the remote media management application 115.

At step 500-D, broker 130 may notify media interaction application 105 that the remote media management application 115 has just resynchronized.

At step 500-E, media interaction application 105 can publishes its current status (possibly modified by previous commands), with media interaction application 105 token attached.

At step 500-F, broker 130 can look up an associated remote media management application 115 channel via media interaction application 105 token and deliver its status to remote media management application 115.

Media Interaction Application Automatic Resynchronization Protocol

Figure 6:
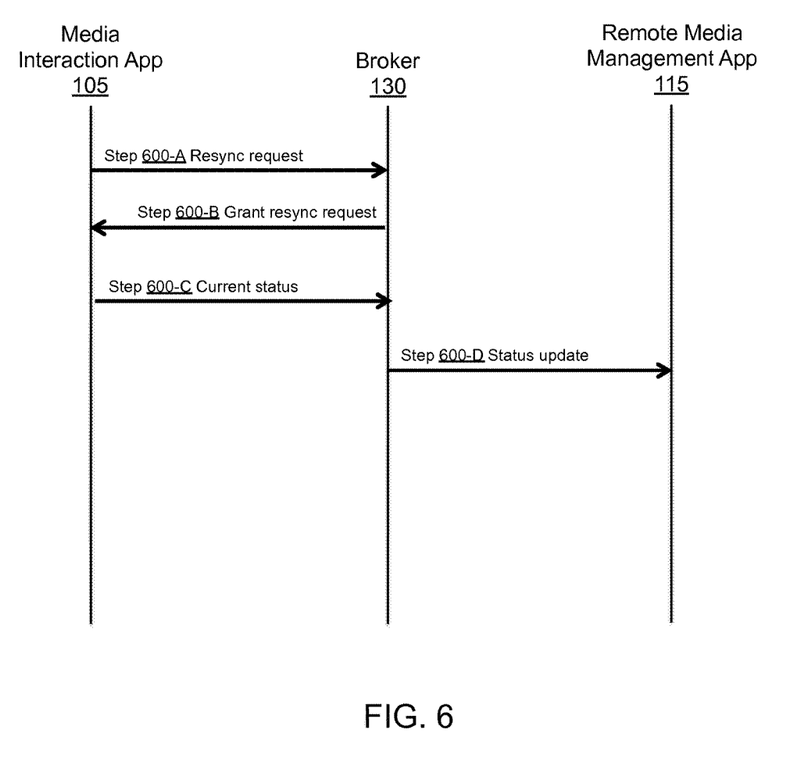
FIG. 6 illustrates an exemplary embodiment of an automatic resynchronization protocol at the media interaction application, in accordance with the present disclosure.

FIG. 6 illustrates an exemplary embodiment of an automatic resynchronization protocol at the media interaction application 105, in accordance with the present disclosure.

At step 600-A, media interaction application 105 may resume from inactive state (e.g. sleep, frozen, closed). If a media interaction application 105 token exists (saved from previous handshake operation described with respect to FIG. 2), the media interaction application 105 can issue a media interaction application 105 resynchronization with its own media interaction application 105 token attached.

At step 600-B, broker 130 can validate the media interaction application 105 token and may respond to the media interaction application 105 with an acknowledgement. An associated remote media management application 115 token can be looked up and the media interaction application 105 can be re-subscribed to the message channel identified by the remote media management application 115 token.

At step 600-C, media interaction application 105 can publishes its current status (in some cases, modified by previous commands), with media interaction application 105 token attached.

At step 600-D, broker 130 can look up an associated remote media management application 115 channel via media interaction application 105 token and deliver its status to remote media management application 115.

Remote Media Management Application Resynchronization Protocol

Figure 7:
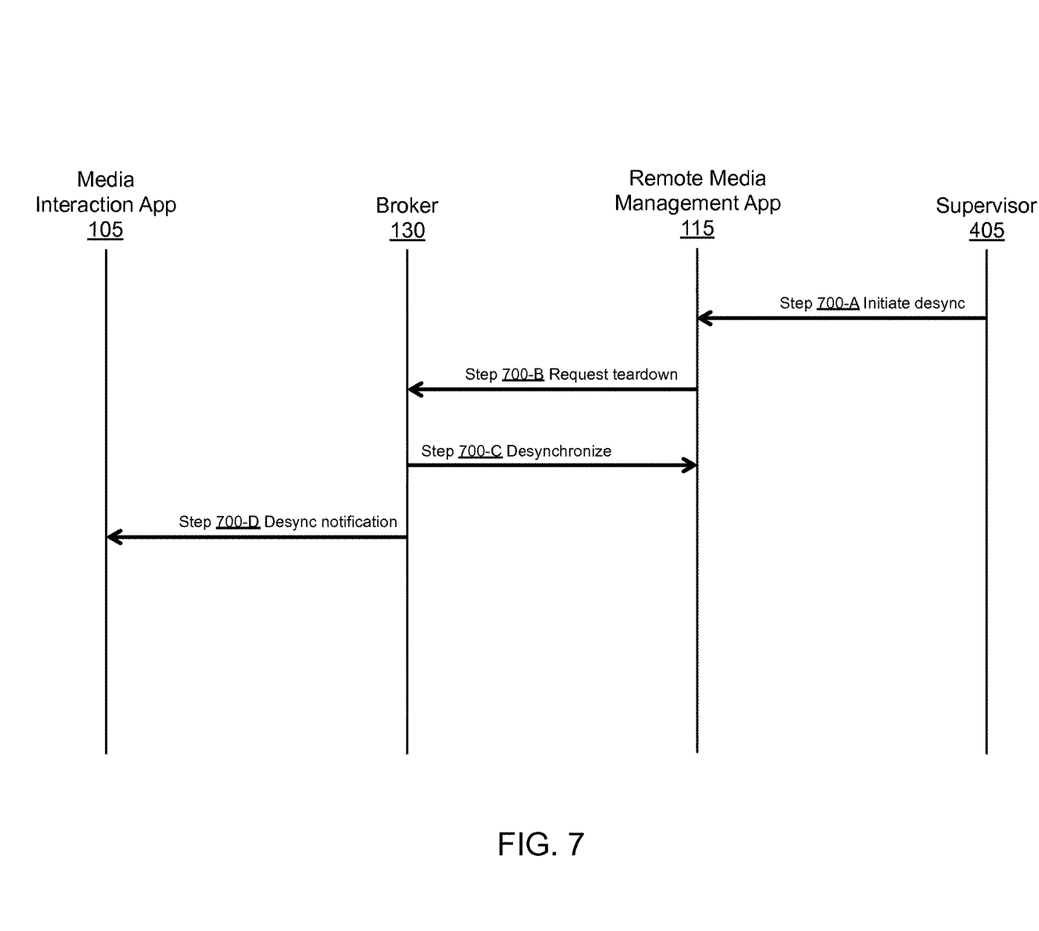
FIG. 7 illustrates an exemplary embodiment of a desynchronize protocol at the remote media management application, in accordance with the present disclosure.

FIG. 7 illustrates an exemplary embodiment of a desynchronize protocol at the remote media management application 115, in accordance with the present disclosure.

At step 700-A, supervisor may initiate a desynchronization protocol at remote media management application 115. For example, by tapping on a "Disconnection Session" button.

At step 700-B, remote media management application 115 can request a teardown of synchronized session from the broker 130, with its own remote media management application 115 token attached.

At step 700-C, broker 130 can validate remote media management application 115 token and acknowledge the teardown request by telling the remote media management application 115 to desynchronize its own local state.

At step 700-D, broker 130 can identify a media interaction application 105 token via remote media management application 115 token lookup, and may notify media interaction application 105 to desynchronize its own local state. Broker 130 can then destroy remote media management application 115/media interaction application 105 token associations, the tokens themselves, and may perform a cleanup of buffered and/or persistent data as indicated by business rules.

Media Interaction Application Resynchronization Protocol

Figure 8:
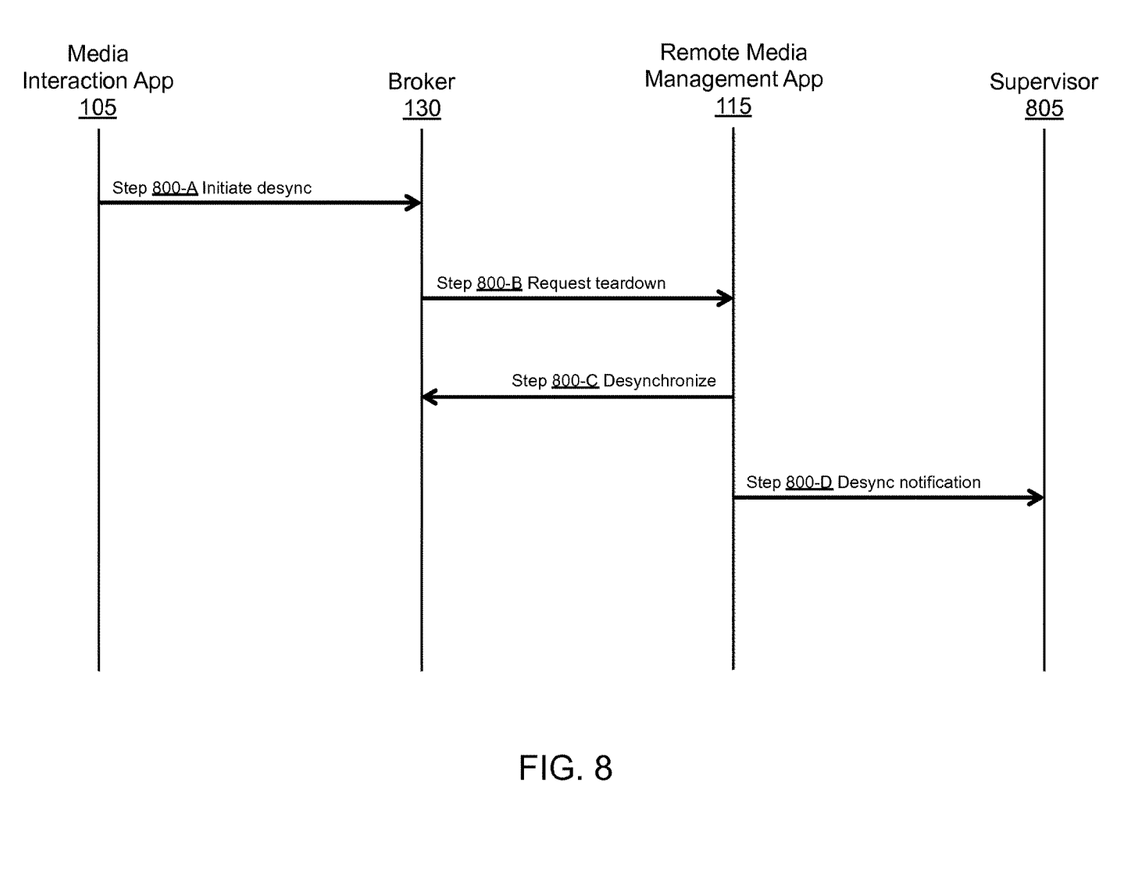
FIG. 8 illustrates an exemplary embodiment of a desynchronize protocol at the media interaction application, in accordance with the present disclosure.

FIG. 8 illustrates an exemplary embodiment of a desynchronize protocol at the media interaction application 105, in accordance with the present disclosure.

At step 800-A, a subject may initiate a desynchronization protocol from media interaction application 105.

At step 800-B, media interaction application 105 may request teardown of synchronized session from the broker 130, with its own media interaction application 105 token attached.

At step 800-C, broker 130 can validate a media interaction application 105 token and acknowledge the teardown request by telling the media interaction application 105 to desynchronize its own local state.

At step 800-D, broker 130 may identify a remote media management application 115 token via media interaction application 105 token lookup, and may notify remote media management application 115 to desynchronize its own local state. Broker 130 can then destroy remote media management application 115/media interaction application 105 token associations, the tokens themselves, and may perform a cleanup of buffered and/or persistent data as dictated by business rules.

Computing Device

Figure 9:
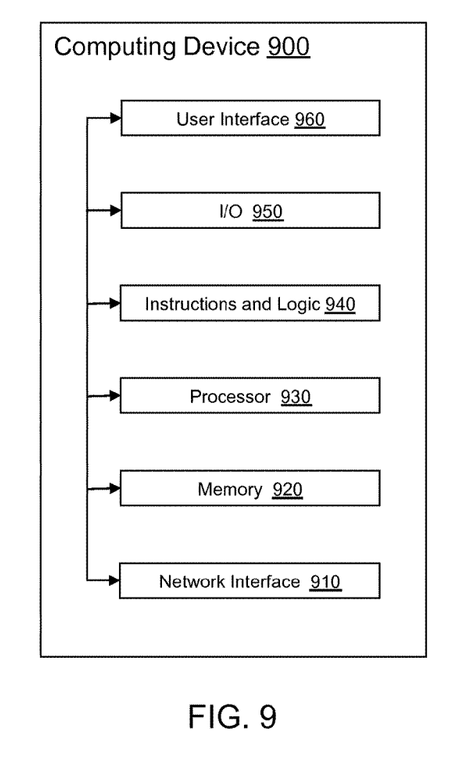
FIG. 9 is a block diagram of an exemplary embodiment of a computing device, in accordance with the present invention.

FIG. 9 is a block diagram of an exemplary embodiment of a Computing Device 900 in accordance with the present invention, which in certain operative embodiments can comprise, for example, the media delivery device 110, the media management device 120, the network server 135, and/or the network server 145 of FIG. 1. Computing Device 900 can comprise any of numerous components, such as for example, one or more Network Interfaces 910, one or more Memories 920, one or more Processors 930 including program Instructions and Logic 940, one or more Input/Output (I/O) Devices 950, and one or more User Interfaces 960 that may be coupled to the I/O Device(s) 950, etc.

Computing Device 900 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise Computing Device 900. Such a Computing Device 900 can comprise components such as one or more Network Interfaces 99, one or more Processors 930, one or more Memories 920 containing Instructions and Logic 940, one or more Input/Output (I/O) Devices 950, and one or more User Interfaces 960 coupled to the I/O Devices 950, etc.

Memory 920 can be any type of apparatus known in the art that is capable of storing analog or digital information, such as instructions and/or data. Examples include a nonvolatile memory, volatile memory, Random Access Memory, RAM, Read Only Memory, ROM, flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein.

Input/Output (I/O) Device 950 may comprise any sensory-oriented input and/or output device known in the art, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 900.

Instructions and Logic 940 may comprise directions adapted to cause a machine, such as Computing Device 900, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be embodied as machine code, source code, object code, compiled code, assembled code, interpretable code, and/or executable code, etc., in hardware, firmware, and/or software. Instructions and Logic 940 may reside in Processor 930 and/or Memory 920.

Network Interface 910 may comprise any device, system, or subsystem capable of coupling an information device to a network. For example, Network Interface 910 can comprise a telephone, cellular phone, cellular modem, telephone data modem, fax modem, wireless transceiver, Ethernet circuit, cable modem, digital subscriber line interface, bridge, hub, router, or other similar device.

Processor 930 may comprise a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can comprise a general-purpose device, such as a microcontroller and/or a microprocessor, such the Pentium IV series of microprocessors manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

User Interface 960 may comprise any device and/or means for rendering information to a user and/or requesting information from the user. User Interface 960 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

Example System Components

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Ruby™, Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any operating system or environment executing in a virtualized or non-virtualized environment, using any programming language suitable for software development, including, but not limited to, different versions of Microsoft Windows™, Android™, Apple™, Mac™, iOS™, UnixT™/X-Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as PostgreSQL™, MongoDB™, Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a media delivery device 110 having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. The figures herein represent example use cases for the syntactic tagging system and are not intended to be limiting on the scope of the invention. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A system for facilitating parental management of media content delivery to children, comprising:
   a child's media interaction application executing on a child's media delivery device and configured to collect the child's media interaction data comprising the child's user interactions with media content, said media content obtained from a third-party content provider and delivered by a stand-alone media delivery application executing on the child's media delivery device;
   a parent's remote media management application executing on a parent's portable electronic device and configured to monitor the child's media interaction data and further configured to let the parent issue at least one of a set of media management instructions to the child's media interaction application via secure communications;
   a communications broker executing on a first network server and configured to provide the secure communications between the child's media interaction application and the parent's remote media management application, said parent's remote media management application authorized to engage in said secure communications by the parent entering a connect code provided by the communications broker; and
   a media interaction analysis application executing on a second network server and configured (1) to receive the child's media interaction data from the child's media interaction application, (2) to transform the child's media interaction data into summary media interaction data, and (3) to provide the summary media interaction data to the parent's remote media management application;
   wherein the child's media interaction application is further configured to transmit the child's media interaction data to the parent's remote media management application via the communications broker using the secure communications,
   wherein the parent's remote media management application is further configured to issue the media management instructions to the child's media interaction application via the communications broker using the secure communications,
   wherein the media interaction analysis application is further configured to receive the child's media interaction data via the communications broker; and
   wherein said connect code is issued by the child's media interaction application in response to the parent initiating a connection request to the child's media interaction application from the parent's remote media management application via the communications broker, and after the communications broker supplies the connect code to the child's media interaction application for subsequent issuance to the parent's remote media management application.

* * * * *